United States Patent
Reunamäki et al.

(10) Patent No.: US 8,156,229 B2
(45) Date of Patent: *Apr. 10, 2012

(54) DEVICE DISCOVERY AND CONNECTION ESTABLISHMENT FOR AD HOC NETWORKS

(75) Inventors: Jukka Reunamäki, Tampere (FI); Arto Palin, Viiala (FI); Juha Salokannel, Kangasala (FI); Harald Kaaja, Jäarvenpää (FI); Jari Jokela, Ylöjärv (FI); Mika Kasslin, Espoo (FI)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/836,817

(22) Filed: Jul. 15, 2010

(65) Prior Publication Data

US 2010/0278077 A1    Nov. 4, 2010

Related U.S. Application Data

(63) Continuation of application No. 10/772,255, filed on Feb. 6, 2004, now Pat. No. 7,809,835.

(51) Int. Cl.
*G06F 15/16* (2006.01)
*H04W 72/00* (2009.01)

(52) U.S. Cl. .................... 709/227; 709/236; 455/464

(58) Field of Classification Search .......... 709/203–205, 709/217–219, 227–229, 236–237; 370/328–330, 370/338; 455/453, 464–466
See application file for complete search history.

(56) References Cited

U.S. PATENT DOCUMENTS

| | | | |
|---|---|---|---|
| 6,842,460 B1 | 1/2005 | Olkkonen et al. | |
| 7,079,599 B2* | 7/2006 | Karaoguz | 375/329 |
| 7,110,380 B2 | 9/2006 | Shvodian | |
| 7,161,923 B2 | 1/2007 | Young | |
| 7,277,412 B2 | 10/2007 | Sugaya et al. | |
| 7,280,801 B2* | 10/2007 | Dahl | 455/41.2 |
| 2003/0235175 A1 | 12/2003 | Naghian et al. | |
| 2004/0170217 A1 | 9/2004 | Ho | |
| 2005/0147071 A1 | 7/2005 | Karaoguz et al. | |
| 2006/0045053 A1 | 3/2006 | Erlich et al. | |
| 2006/0072491 A1 | 4/2006 | Simons | |
| 2010/0202315 A1* | 8/2010 | Kwak | 370/252 |

OTHER PUBLICATIONS

Batra et al., "Multi-band OFDM Physical Layer Proposal", Project IEEE P802.15 Working Group for Wireless Personal Area Networks (WPANs), Sep. 17, 2003, Slides 1-51.

* cited by examiner

*Primary Examiner* — Yasin Barqadle (57) ABSTRACT

A wireless device transmits beacon packets at periodically occurring time intervals across a wireless channel. When the wireless communications device has not formed a piconet with one or more remote devices, the device scans the wireless channel for a predetermined amount of time immediately following each of the periodically occurring time intervals. During this time a remote device may respond to the beacon packet.

20 Claims, 10 Drawing Sheets

DEVICE DISCOVERY AND CONNECTION ESTABLISHMENT FOR AD HOC NETWORKS

CROSS-REFERENCE TO RELATED PATENT APPLICATIONS

This application is a Continuation of U.S. application Ser. No. 10/772,255, filed Feb. 6, 2004, now U.S. Pat. No. 7,809,835, incorporated herein by reference in its entirety.

FIELD OF THE INVENTION

The present invention relates to wireless communications. More particularly, the present invention relates to techniques for establishing ad hoc wireless networks.

BACKGROUND OF THE INVENTION

Short-range wireless proximity networks typically involve devices that have a communications range of one hundred meters or less. To provide communications over long distances, these proximity networks often interface with other networks. For example, short-range networks may interface with cellular networks, wireline telecommunications networks, and the Internet.

IEEE 802.15.3 defines an ad hoc wireless short-range network (referred to as a piconet) in which a plurality of devices may communicate with each other. One of these devices is called piconet coordinator (PNC), which coordinates timing and other operational characteristics for the network. The remaining devices in the network are known as DEVs. The timing of piconets is based on a repeating pattern of "superframes" in which the network devices may be allocated communications resources.

A high rate physical layer (PHY) standard is currently being selected for IEEE 802.15.3a. The existing IEEE 802.15.3 media access control layer (MAC) is supposed to be used as much as possible with the selected PHY. Currently, there are two remaining PHY candidates. One of these candidates is based on frequency hopping application of orthogonal frequency division multiplexing (OFDM). The other candidate is based on M-ary Binary offset Keying. The OFDM proposal is called Multiband OFDM (MBO). Moreover, in order to further develop the OFDM proposal outside of the IEEE, a new alliance has been formed called the MultiBand OFDM Alliance (MBOA).

MBO utilizes OFDM modulation and frequency hopping. MBO frequency hopping involves the transmission of each of the OFDM symbols at one of three frequency bands according to pre-defined code, referred to as a Time Frequency Code (TFC). Time Frequency Codes can be used to spread interleaved information bits across a larger frequency band.

Presently, there is an interest within the MBOA to create a Medium Access Control (MAC) layer that would be used with the OFDM physical layer instead of the IEEE 802.15.3 MAC layer. This would involve developing a new procedure for device discovery and connection setup. It is desirable for such a MAC to provide fast device discovery and connection establishment, because ad-hoc networks can be very dynamic and connections may change quite rapidly.

Before piconets are formed, packets (such as beacons) are typically transmitted and received by devices in order to setup a network. For instance, in IEEE 802.15.3 networks, beacons are sent at the beginning of each superframe. After sending a beacon, the device must listen for a predetermined time period to determine whether there are requests to join the device's network. A response to such a request is scheduled for transmission in the following beacons. Thus, they are sent in the following superframes. Accordingly, in IEEE 802.15.3, connection establishment is not performed immediately, even in situations where only two devices are involved.

SUMMARY OF THE INVENTION

The present invention provides a method and device for forming a piconet. The method and device transmit a beacon packet across a wireless channel during a first predetermined time interval. During a second predetermined time interval immediately following the first predetermined time interval, the method and device scan the wireless channel and receive a piconet joining request packet from a remote wireless communications device. During a third predetermined time interval that immediately follows the second predetermined time interval, the method and device transmit a confirmation packet to the remote wireless communications device.

The present invention provides a further method and device that transmits a first beacon packet across a wireless channel during a first predetermined time interval and scans the wireless channel for a second predetermined time interval that immediately follows the first time interval. During the second time interval, a request for additional information is received from a remote wireless communications device. In response to this request, the additional information is transmitted with a second beacon packet across the wireless channel.

In another aspect of the present invention, beacon packets are transmitted at periodically occurring time intervals across a wireless channel by a wireless communications device. When the wireless communications device has not formed a piconet with one or more remote devices, the device scans the wireless channel for a predetermined amount of time immediately following each of the periodically occurring time intervals.

According to yet another aspect of the present invention, a wireless communications device monitors a wireless channel for transmissions during a predetermined time interval. Also during this time interval, the wireless communications device receives a beacon packet from a remote wireless communications device. If the remote wireless communications device is the only transmitting device during the predetermined time interval, the wireless communications device sends a response packet to the remote device. Transmission of this response packet immediately follows receipt of the beacon packet.

The present invention advantageously provides for fast connection establishment and device discovery. Also the present invention provides for efficient energy consumption in wireless devices. Further features and advantages will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
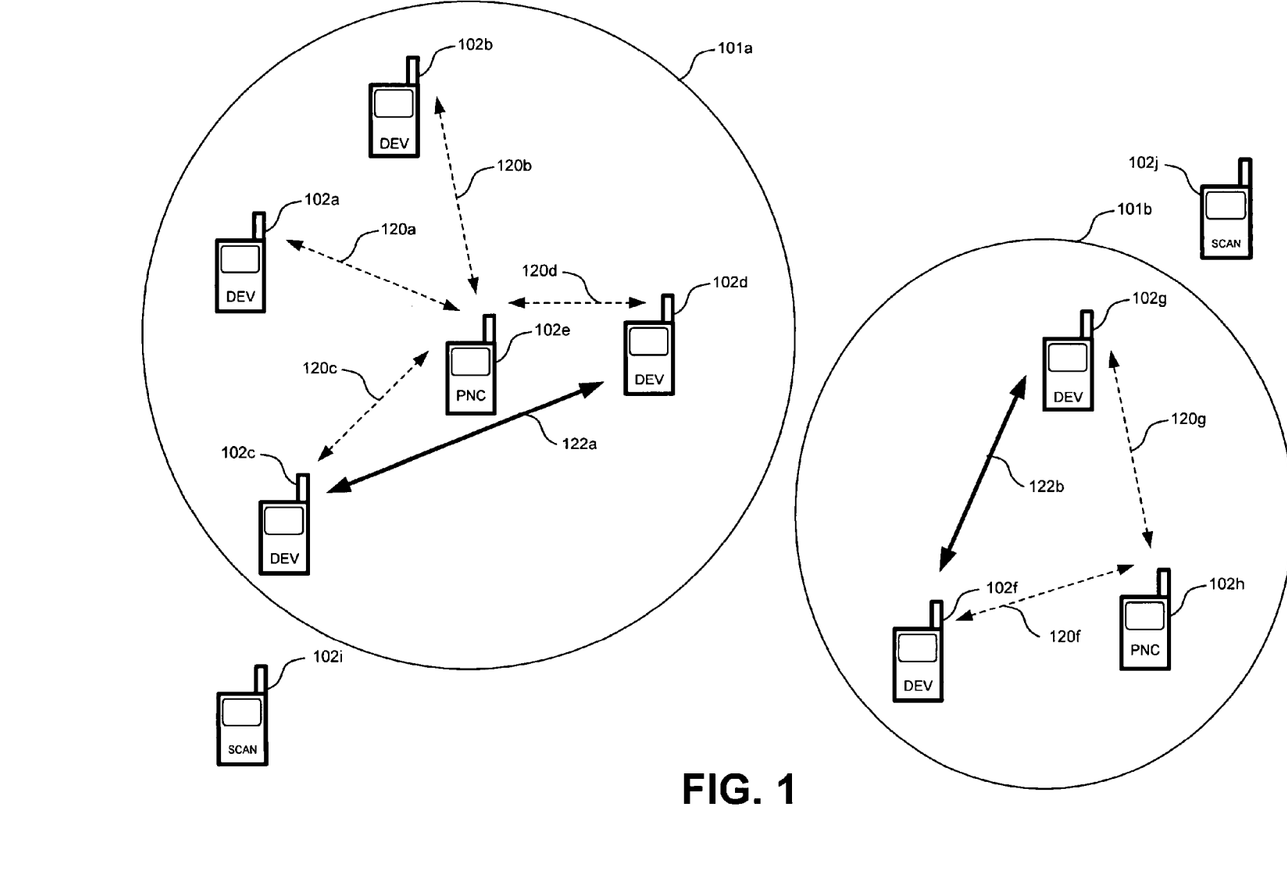
FIG. 1 is a diagram of an exemplary operational environment.

Before describing the invention in detail, it is first helpful to describe an environment in which the present invention may be employed. Accordingly, FIG. 1 is a diagram of an exemplary operational environment. This environment includes multiple piconets 101, each having a plurality of devices 102. For instance, FIG. 1 shows a piconet 101a, which includes a piconet coordinator (PNC) 102e, and member devices (DEVs) 102a-d. FIG. 1 also shows a piconet 101b, which includes a PNC 102h, as well as DEVs 102f and 102g.

In piconet 101a, each of devices 102a-d communicate with PNC 102e across a corresponding link 120. For example, DEV 102a communicates with PNC 102e across a link 120a. In addition, DEVs 120a-d may communicate with each other directly. For instance, FIG. 1 shows DEVs 102c and 102d communicating via a direct link 122a.

In piconet 101b, each of DEVs 102f and 102g may communicate with PNC 102h across a corresponding link 120. For instance, DEV 102f communicates with PNC 102h across a link 120f, while DEV 102g communicates with PNC 102h across a link 120g. Member devices in piconet 101b may also communicate with each other directly. For example, FIG. 1 shows DEVs 102f and 102g communicating across a link 122b.

Each of links 122 and 120 may employ various frequency hopping patterns. These patterns may include, for example, one or more Time Frequency Codes (TFCs). In embodiments of the present invention, each piconet 101 employs a particular frequency hopping pattern. These patterns may either be the same or different.

In addition, the environment of FIG. 1 shows a device 102i and a device 102j. These devices are not members of piconets 101a or 101b. Rather, these devices monitor or scan piconet transmissions. For instance, device 102i scans the transmissions of piconet 101a and device 102j scans the transmissions of piconet 101b. Accordingly, these devices are referred to herein as scanning devices.

Figure 2:
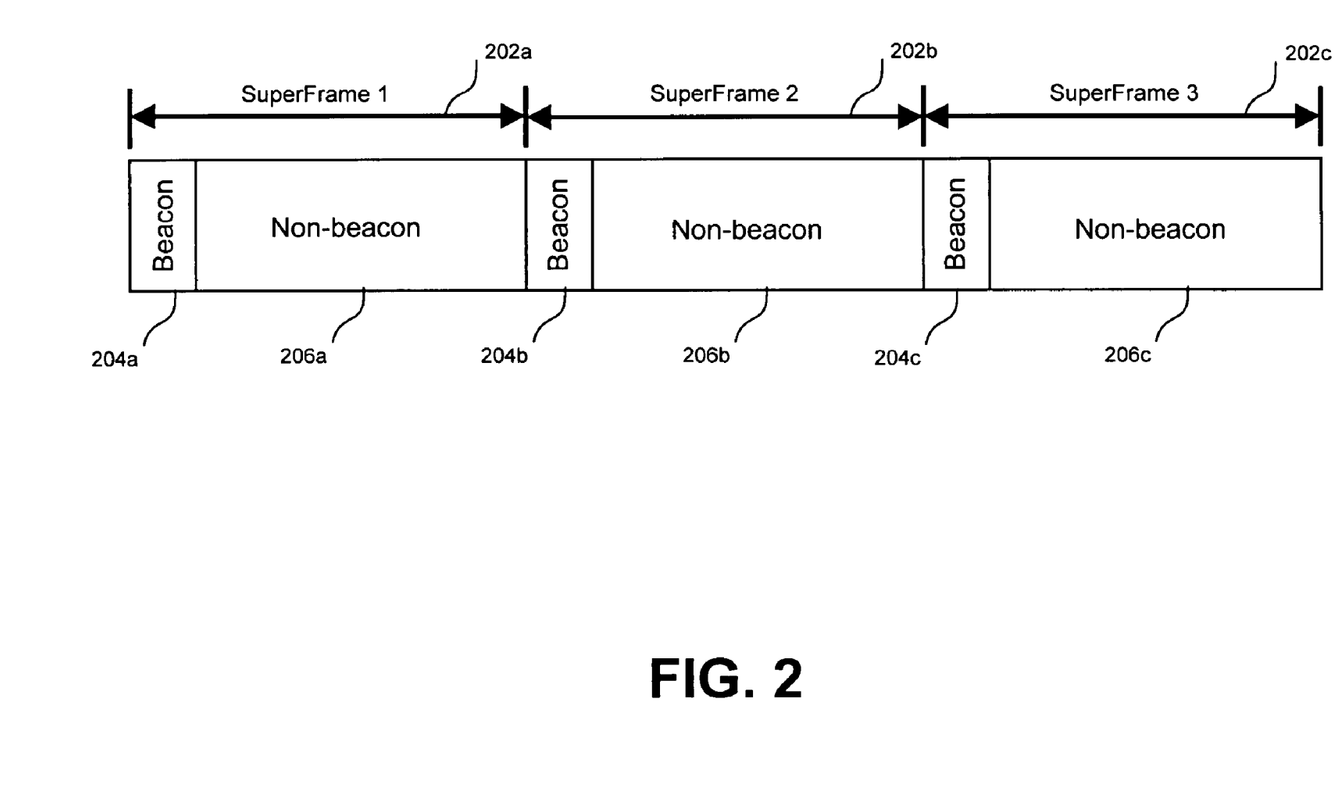
FIG. 2 is a diagram showing an IEEE 802.15.3 superframe format.

Transmissions of piconets 101a and 101b are each based on a repeating pattern called a superframe. Accordingly, FIG. 2 is a diagram showing an IEEE 802.15.3 superframe format. In particular, FIG. 2 shows a frame format having superframes 202a, 202b, and 202c. As shown in FIG. 2, superframe 202b immediately follows superframe 202a, and superframe 202c immediately follows superframe 202b.

Each superframe 202 includes a beacon portion 204 and a non-beacon portion 206. Beacon portions 204 convey transmissions from a PNC (such as PNC 102e) and are used to set timing allocations and to communicate management information for the piconet. For example, beacon portions 204 may convey transmissions that direct devices in piconet 101a (e.g., DEVs 102a-d) to employ certain frequency hopping patterns, such as specific TFCs. In addition, according to the present invention, beacon portions 206 may be used to transmit information regarding services and features of the transmitting PNC (e.g., information services, applications, games, topologies, rates, security features, etc.) or any device within the piconet. The transmission of such information in beacon portions 204 may be in response to requests from devices, such as scanning devices.

Non-beacon portions 206 are used for devices to communicate data according to, for example, frequency hopping techniques that employ OFDM and/or TFCs. For instance, non-beacon portions 206 may support data communications across links 120 and 122. In addition, devices (e.g., DEVs 102a-d) may use non-beacon portions 206 to transmit control information, such as request messages to other devices (e.g., PNC 102e). To facilitate the transmission of traffic, each DEV may be assigned a particular time slot within each non-beacon portion 206. These time slots may be allocated by the PNC.

II. Network Formation

The present invention streamlines network (e.g., piconet) formation and device discovery. This streamlining advantageously provides a fast and fluent user experience in device discovery and piconet establishment.

The basic idea of low power consuming, but feasibly fast device discovery is based on sending beacons at fixed intervals. Before beacon transmission, a device (e.g., a PNC or master) may synchronize itself to the channel by measuring the channel usage (regarding MBOA devices). For example, before the transmission of each beacon, the channel usage may be scanned and the beacon can be transmitted so that it causes minimum interference to other active devices. After the beacon is transmitted, the device may monitor the channel to determine whether there are any devices responding to the beacon.

To allow for successful device detection, the present invention provides for the establishment of a maximum time-period that cannot be exceeded when sending subsequent beacons. In embodiments, beacon-transmitting devices send beacons at fixed time intervals. However, in further embodiments, beacons can be sent at non-fixed intervals. An example of such a maximum time interval is approximately one second. Accordingly, other devices (referred to herein as scanning devices) know the amount of time necessary to scan the channel until all beacon-transmitting devices are found. Actual beacon transmission times may be shifted by one or more symbols in order to cause minimum interference with other active devices. However, in implementations, such small deviations in the alignment of beacon transmission times do not significantly increase the time interval between beacons. Examples of such implementations include ones that employ symbols having a short duration, such as OFDM symbols of approximately 3400 ns duration.

Figure 3:
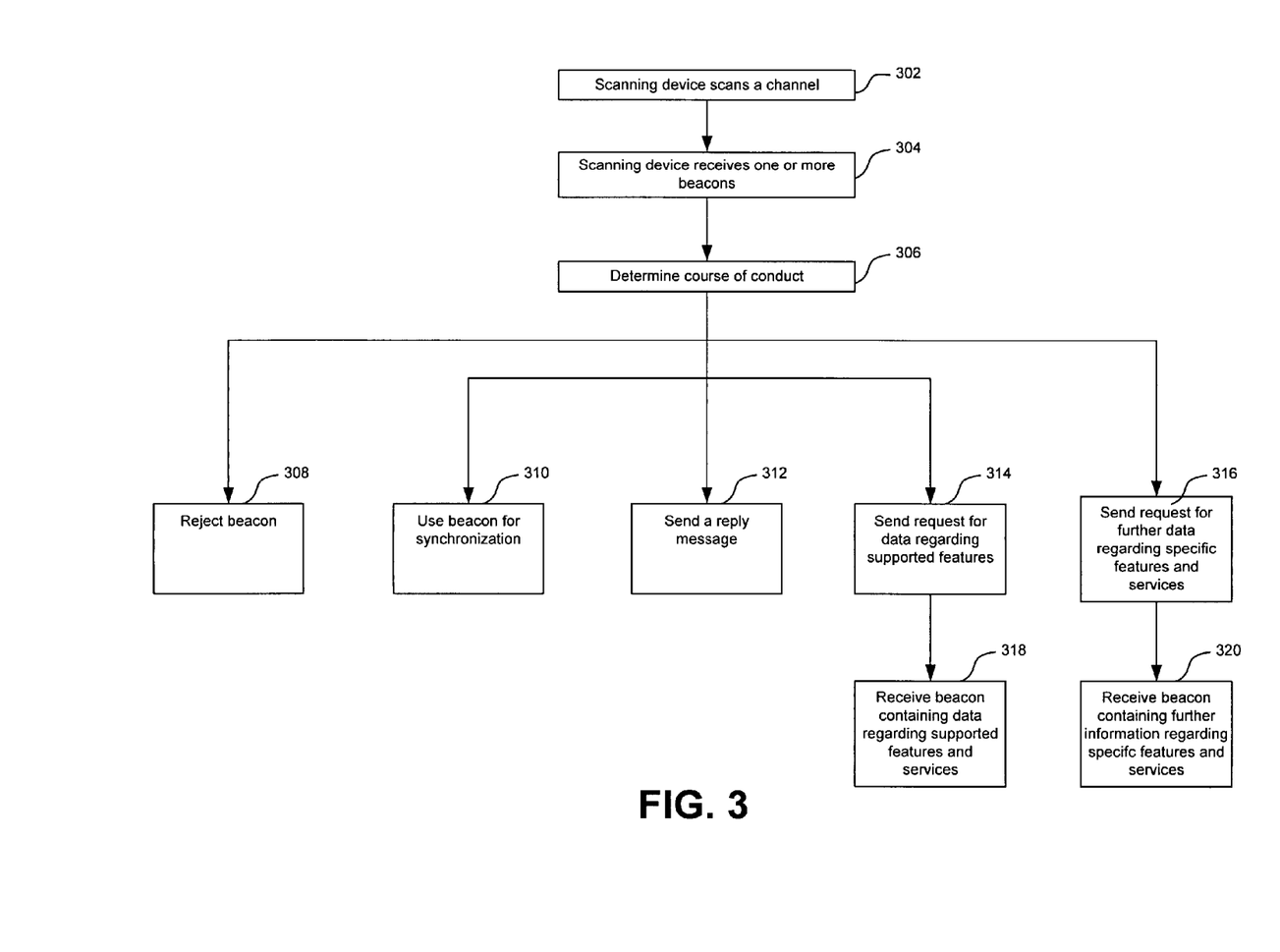
FIG. 3 is a flowchart of an operation performed by a scanning device, according to one embodiment of the present invention.

FIG. 3 is a flowchart of an operation performed by a scanning device, such as device 102i or 102j, according to one embodiment of the present invention. Accordingly, this operation may be performed in the exemplary operational environment of FIG. 1. This operation includes an initial step 302. In this step, the scanning device scans a channel for one or more beacons. This is performed to find all transmitting devices. This includes beacon-transmitting devices (e.g., PNCs or masters), as well as any other network devices (e.g., DEVs or slaves). In embodiments, the scanning device scans the channel for at least a maximum defined beacon interval time (e.g., one second) to find all devices. However, scanning multiple beacon intervals may provide the scanning device with some additional tolerance against interference (e.g., possible colliding transmissions between neighboring MBOA piconets).

Accordingly, as a result of the scanning performed in step 302, the scanning device obtains information regarding any network (e.g., piconet) associated with the beacon-transmitting device. For instance, by monitoring in step 302 for transmissions between beacons, the scanning device determines whether there are other devices transmitting in the channel (e.g., DEVs or slaves in a piconet with the beacon-transmitting device).

In addition, as a result of the scanning performed in step 302, the scanning device receives one or more beacons that are associated with at least one beacon-transmitting device. This is shown in FIG. 3 as a step 304.

After the scanning device has received a beacon, it may perform various actions. Thus, in a step 306, the scanning device determines one or more courses of conduct. Based on this determination, one or more of steps 308-316 may be performed.

For example, in a step 308, the scanning device may reject the beacon by not replying. Also, in a step 310, the scanning device may use the beacon for synchronization purposes.

Alternatively, in a step 312, the scanning device may send a reply message to join the piconet. This request may also request certain actions, such as a role switch between the beacon transmitting device and the scanning device once the scanning device joins the piconet.

Additionally, the scanning device may request the beacon-transmitting device to send out more data regarding the beacon-transmitting device and supported services in the next beacon. As shown in a step 314, this may include a request for data regarding supported features. Also, as shown in step 316, this may include a request for further information regarding specific feature(s) and service(s) offered by the beacon-transmitting device and/or the feature(s) and service(s) offered by the existing piconet.

If step 314 or 316 is performed, the beacon-transmitting device sends a response in the next beacon. Accordingly, FIG. 3 shows a step 318 following step 314. In this step, the scanning device receives a beacon containing data regarding supported features. Also, FIG. 3 shows a step 320 following step 316. In step 320, the scanning device receives further information regarding specific feature(s) and service(s) offered by the beacon-transmitting device and/or the feature(s) and service(s) offered by the existing piconet. Thus, the present invention advantageously allows for time-consuming association and disassociation phases to be bypassed when a scanning device only needs information regarding a beacon-transmitting device (or information regarding a piconet where the beacon-transmitting device operates). Normally association may include creation of security membership that increases association time.

As described above, a scanning device may respond to a beacon in steps 312, 314, and 316. Accordingly, performance of each of these steps includes sending a transmission to the beacon-transmitting device. In embodiments of the present invention, such transmissions are performed in accordance with a collision avoidance algorithm, such as CSMA/CA.

However, if the scanning device would be the first to join the network, then there is no slot allocation in the non-beacon portion of the superframe.

Thus, if the scanning device determines in step 302 that there are no other devices in the network, then steps 312, 314, and 316 may be performed immediately after the beacon is received. This advantageously provides for streamlined network formation.

Figure 4:
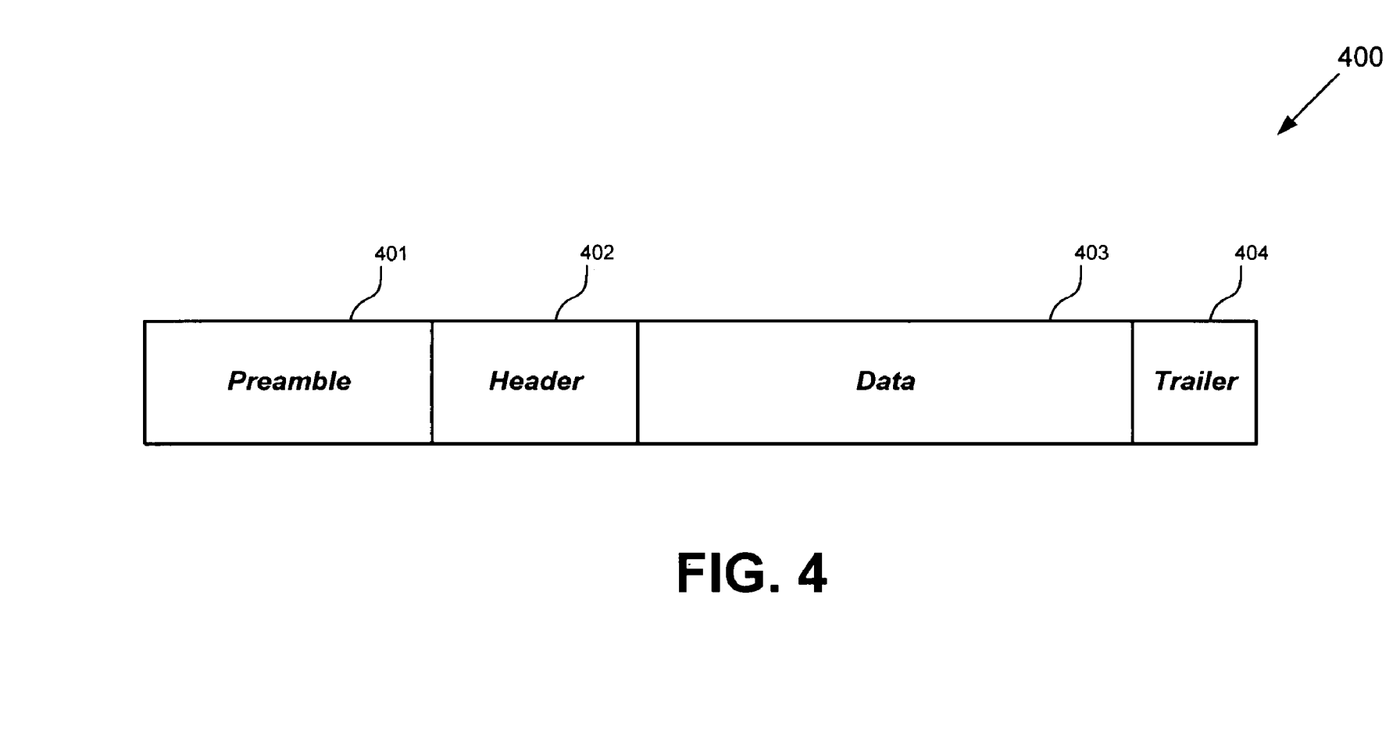
FIG. 4 is a diagram of an exemplary packet format.

FIG. 4 is a diagram of an exemplary packet format 400 that may be used for the exchange of information in embodiments of the present invention. Accordingly, this format may be used for beacons, transmissions in response to beacons, and other network traffic. As shown in FIG. 4, packet format 400 includes a preamble 401, a header portion 402, a data portion 403, and a trailer portion 404.

Preamble 401 is used by receiving devices to obtain synchronization with the packet. A certain preamble 401 may by used for beacon packets, while a different preamble 401 may be used for other packets. This feature enables scanning devices to differentiate between beacons and other network traffic.

Header portion 402 includes media access control (MAC) and physical layer (PHY) headers. In addition, header portion 402 may include error checking bits, tail bits, and/or pad bits. The PHY header is used by the receiving device to decode the packet correctly. The MAC header is used to inform the receiving device of the data included in portion 403.

Table 1, below, provides an exemplary listing of information parameters conveyed in header portion 402. In this table, the left-hand column lists parameters, while the right hand column indicates whether the parameter is associated with the PHY header, MAC header, or is extra information.

TABLE 1

| Parameter Description | PHY/MAC/EXTRA |
|---|---|
| Data rate | PHY |
| Frame length | PHY |
| Band extension | PHY |
| Destination ID | MAC |
| Source ID | MAC |
| Network ID | MAC |
| ACK policy | MAC |
| Frame type (beacon, data, etc.) | MAC |
| Header error check | Extra |

Data portion 403 includes information as defined by the MAC header in portion 402. Trailer portion 404 may include error checking bits, tail bits, and/or pad bits. Table 2 provides an exemplary listing of parameters that may be conveyed in portion 403 for a beacon frame. For instance, one or more of these parameters may be included in portion 403 in response to a scanning device request of step 314 or 316.

TABLE 2

| Parameter Description |
|---|
| Superframe duration |
| Access period duration |
| Needed parameters for response |
| Network capabilities (mesh, power, mode, etc.) |
| Extended beacon parameters (for example name) |

Table 3 provides an exemplary listing of parameters that may be conveyed in portion 403 for a beacon response type frame. A scanning device may transmit such a frame, for example, in steps 312, 314, or 316.

TABLE 3

| Parameter Description |
| --- |
| Device address |
| Device capabilities |
| Master/slave request |
| Extended beacon request |

Figure 5:
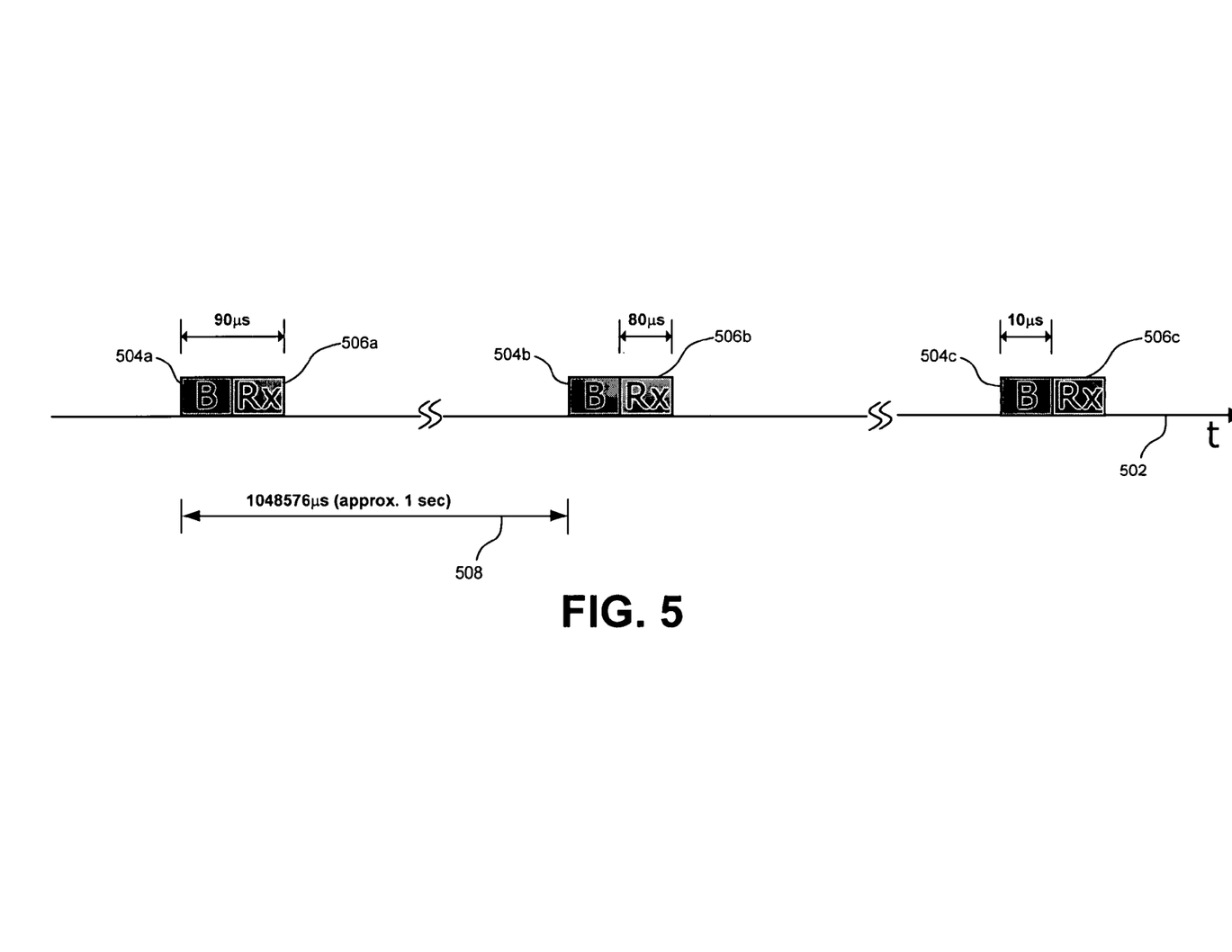
FIG. 5 is a diagram illustrating an operation of a beacon-transmitting device according to one embodiment of the present invention.

FIG. 5 is a diagram illustrating an operation of a beacon-transmitting device along a time axis 502 according to one embodiment of the present invention. As shown in FIG. 5, the beacon-transmitting device transmits beacons at regularly occurring beacon transmission intervals (B) 504. Following each beacon transmission interval 504, the beacon-transmitting device operates in a receiving interval (Rx) 506, during which the device listens for any responses to the previously transmitted beacon.

In embodiments of the present invention, this operation (referred to as the "advertisement stage") is employed by a Beacon-transmitting device (e.g., a PNC or master) before other devices form a piconet with it. Accordingly, this feature advantageously provides for low power consumption. Also, since receiving intervals 506 immediately follow beacon transmission intervals 504, the first device to join the piconet benefits from a fast connection setup. This allows for streamlined point-to-point connections.

FIG. 5 shows each beacon transmission interval 504 interval being 10 microseconds in duration, and each receiving interval 506 being 80 microseconds in duration. However, other durations may be employed. Moreover, FIG. 5 shows a period 508 between beacon transmission intervals 504 having a duration of 1,048,576 microseconds (approximately 1 second). As with intervals 504 and 506, other durations may be employed for period 508.

The timings of FIG. 5 are provided as examples. However, other timings are within the scope of the present invention. With these timings, low power consumption is reached. For instance, an interval 504 and an interval 506 are 90 microseconds in duration. In embodiments, power consumption is 150 milliwatts once every 1 second for 90 microseconds. This adds total consumed energy by 13.5 microWatts. Moreover, transmission duty cycle 0.001%. Therefore, in such embodiments, a beacon-transmitting device that is not connected to any network, but is available for contacting within 1 second, can send beacons with battery power source for a substantially long amount of time while ensuring fast and fluent user experience in device discovery.

Figure 6A:
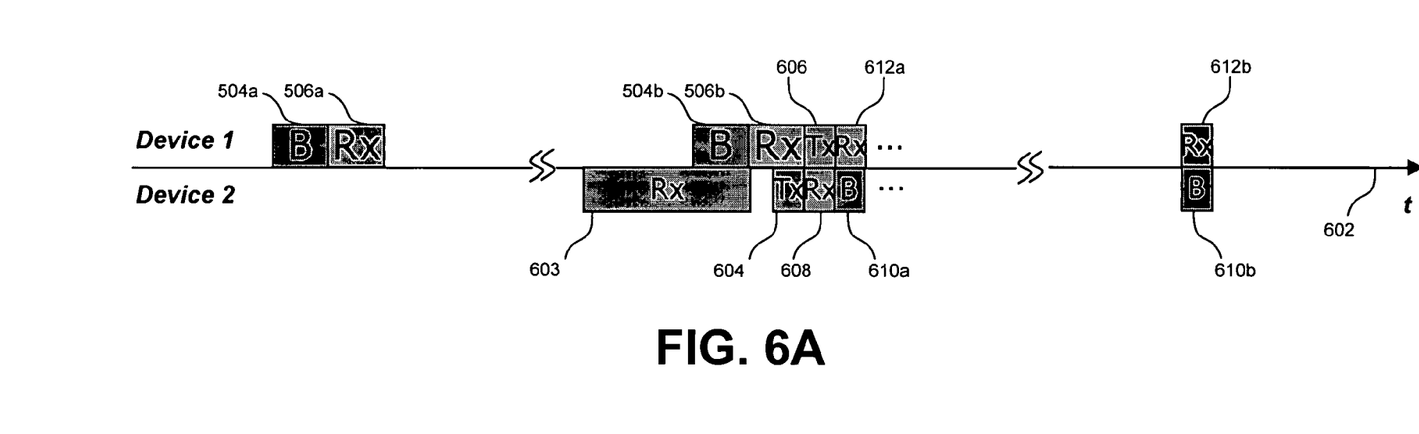
FIGS. 6A and 6B are diagrams illustrating interactions between a first device and a second device, according to embodiments of the present invention.

FIG. 6A is a diagram illustrating an interaction between a first device (Device 1) and a second device (Device 2) along a time axis 602 according to one embodiment of the present invention. At the beginning of this interaction, Device 1 is a beacon transmitting device and Device 2 is a scanning device. Accordingly, FIG. 6A shows Device 1 transmitting beacons at beacon transmission intervals 504a and 504b and listening for responses to the previously transmitted beacon in receiving intervals 506a and 506b.

Accordingly, Device 2 enters a receiving period (Rx) 603. During this period, it receives the beacon transmitted by Device 1 in interval 504b. Upon receipt of this beacon, Device 2 transmits an answer to this beacon in a transmitting interval 604. Device 1 receives this answer in receiving interval 506b. Referring to packet format 400, header 402 indicates the MAC Source ID as Device 2, and the MAC Destination ID as Device 1. In addition, data portion 403 includes master/slave request (also referred to as a MasterRoleReq or a role switch request). By sending this parameter, Device 2 requests that it wishes to become the master or PNC of the network.

In a transmit interval 606, Device 1 transmits a packet, which is received by Device 2 in receiving interval 608. This packet conveys a response to the answer previously transmitted by Device 2. Referring again to packet format 400, header 402 indicates the MAC Source ID as Device 1, and the MAC Destination ID as Device 2. In addition, data portion 403 includes a parameter that confirms the role switch request (this confirmation is also referred to as roleSwitchConfirm). Also, data portion 403 includes a parameter (referred to herein as when BeaconStarts) which indicates a time when the role switch commences and when Device 2 transmits its first beacon.

Accordingly, FIG. 6A shows a beacon transmission interval 610a, which immediately follows receiving interval 608. During this interval, Device 2 transmits a beacon, which is received by Device 1 in a receiving interval 612a. Thus, at this point, Device 2 is the Master/PNC and Device 1 is the slave/DEV. This pattern is repeated again in intervals 610b and 612b.

Figure 6B:
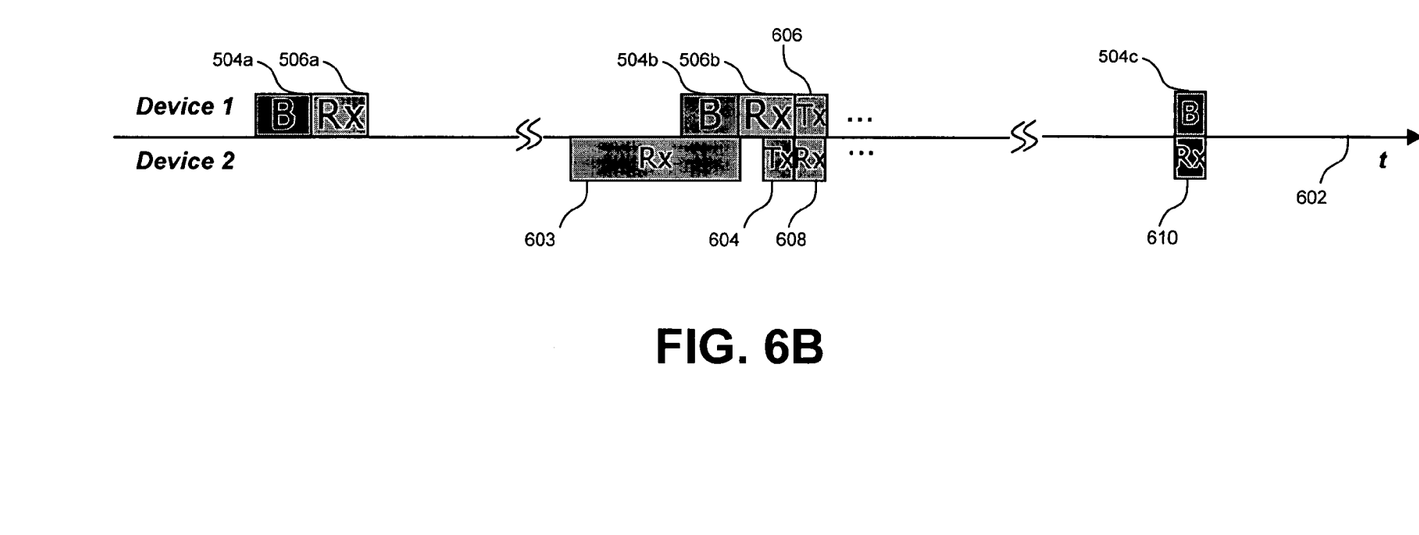

FIG. 6B is a diagram illustrating a further interaction between Device 1 and Device 2 along a time axis 602 according to one embodiment of the present invention. This interaction is similar to the interaction of FIG. 6A. However, in this interaction, no role switch occurs. Accordingly, in FIG. 6B, Device 1 continues the transmission of beacons at interval 504c. This beacon is received by Device 2 in a receiving interval 610.

FIGS. 6A and 6B provide examples of Device 2 being the first device to join the piconet of Device 1. As described above, these example show Device 2 joining the piconet in a fast and efficient manner due to receiving intervals 506, which immediately follow beacon transmitting intervals 504. Moreover, prior to Device 2 joining the piconet, intervals 504 and 506 allow Device 1 to consume a low amount of power. This advantageously allows Device 1 to operate on battery power for an extended duration.

As described above with reference to FIG. 3, in embodiments of the present invention, a scanning device may respond to a beacon by requesting the beacon-transmitting device to send out more data regarding its characteristics, it supported services, and its supported features. An example of this feature is shown in FIG. 7.

Figure 7:
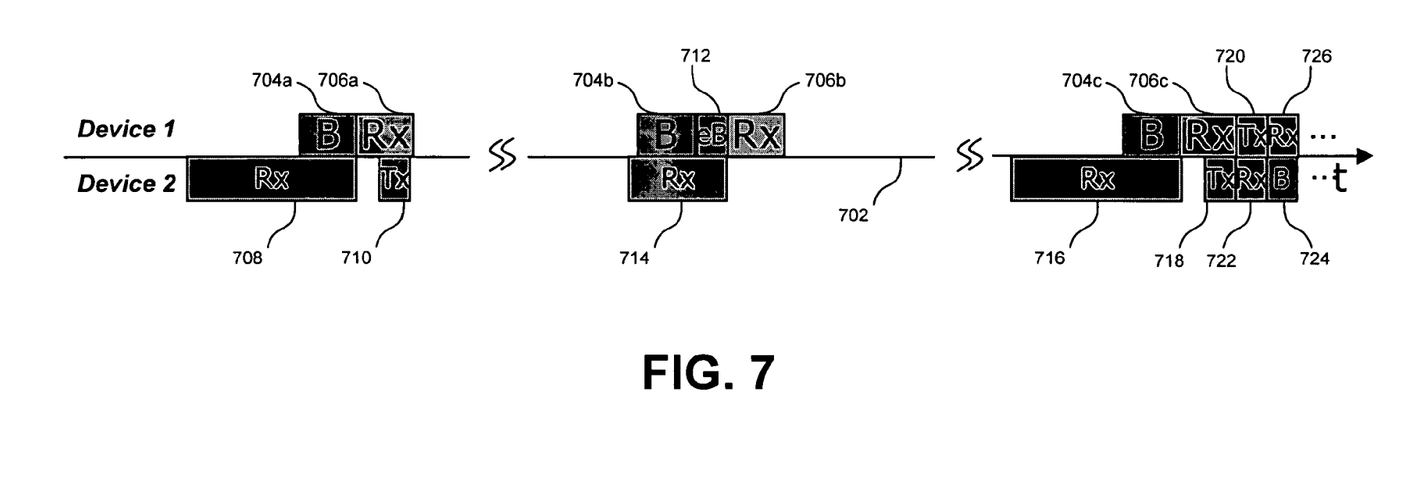
FIG. 7 is a diagram illustrating an exemplary interaction between Device 1 and Device 2, according to one embodiment of the present invention.

FIG. 7 is a diagram illustrating an exemplary interaction between Device 1 and Device 2 along a time axis 702 according to an embodiment of the present invention. In this interaction, Device 1 transmits a beacon during beacon transmitting intervals 704, which may occur approximately every 1 second. Following each interval 704 is a receiving interval 706 in which Device 1 scans for beacon responses.

FIG. 7 shows a receiving interval 708 in which Device 2 scans the beacon channel, finds the beacon transmitted in interval 704a, and sends a response in transmitting interval 710. This response includes a request for further information. Device 1 receives this response in receiving interval 706a. In response to this request, Device 1 sends a beacon extension during an extension interval 712, which immediately follows beacon transmission interval 704b. This extension includes information regarding Device 1, which was requested by Device 2. Immediately following extension interval 712 is receiving interval 706b. During interval 706b, Device 1 scans for responses to the Beacon and Beacon extension transmitted in during intervals 704b and 712.

Device 2 receives the beacon extension in a receive interval 714. Based on the information in this extension, Device 2 may decide whether to join the piconet of Device 1. Accordingly, FIG. 7 shows intervals 704c, 706c, and 716-726. During these intervals, Device 2 joins the piconet of Device 1 and engages in a role switch in the same manner as described above with reference to FIG. 6A.

III. Device Implementation

Figure 8:
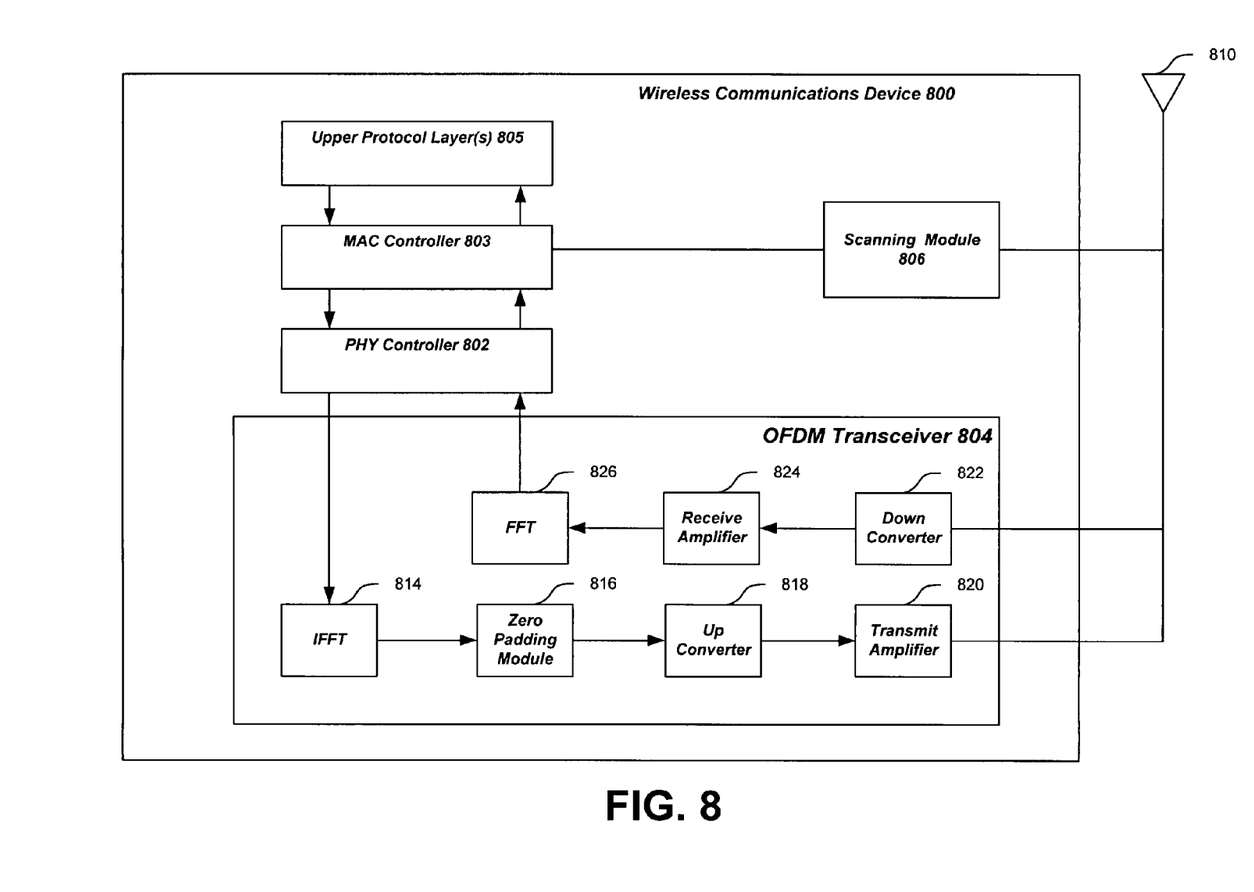
FIG. 8 is a block diagram of an exemplary wireless communications device.

FIG. 8 is a diagram of a wireless communications device 800, which may operate according to the techniques of the present invention. This device may be used in various communications environments, such as the environment of FIG. 1. Also, device 800 may engage in communications according to various scenarios, such as those described above with reference to FIGS. 5, 6A, 6B, and 7. As shown in FIG. 8, device 800 includes a physical layer (PHY) controller 802, a media access controller (MAC) 803, an OFDM transceiver 804, a scanning module 806, and an antenna 810.

MAC controller 803 generates packets for wireless transmission. In addition, MAC controller 803 receives and processes packets that are originated from remote devices. MAC controller 803 exchanges these packets with PHY controller 802. In turn, PHY controller 802 exchanges packets with OFDM transceiver 804. These packets may be in the format described above with reference to FIG. 4.

FIG. 8 shows that OFDM transceiver 804 includes an inverse fast fourier transform (IFFT) module 814, a zero padding module 816, an upconverter 818, and a transmit amplifier 820. IFFT module 814 receives packets for transmission from PHY controller 802. For each of these packets, IFFT module 814 generates an OFDM modulated signal. This generation involves performing one or more inverse fourier transform operations. As a result, this OFDM modulated signal includes one or more OFDM symbols. This signal is sent to zero padding module 816, which appends one or more "zero samples" to the beginning of each OFDM symbol to produce a padded modulated signal. Upconverter 818 receives this padded signal and employs carrier-based techniques to place it into one or more frequency bands. These one or more frequency bands are determined according to a frequency hopping pattern, such as one or more of the TFCs. As a result, upconverter 818 produces a frequency hopping signal, which is amplified by transmit amplifier 820 and transmitted through antenna 810.

FIG. 8 shows that OFDM transceiver 804 further includes a downconverter 822, a receive amplifier 824, and a fast fourier transform (FFT) module 826. These components are employed in the reception of wireless signals from remote devices. In particular, antenna 810 receives wireless signals from remote devices and sends them to downconverter 822. These wireless signals employ frequency hopping patterns, such as one or more of the TFCs.

Upon receipt, downconverter 822 employs carrier-based techniques to convert these signals from its one or more frequency hopping bands (e.g., TFC bands) into a predetermined lower frequency range. This results in modulated signals, which are received by amplifier 824 to generate amplified signals. FFT module 826 performs OFDM demodulation on these signals. This demodulation involves performing a fast fourier transform for each symbol that is conveyed in the amplified signals.

As a result of this demodulation, FFT module 826 produces one or more packets, which are sent to PHY controller 802. These packets may convey various information, such as payload data and protocol header(s). Upon receipt, PHY controller 802 processes these packets. This may involve removing certain PHY layer header fields, and passing the remaining portions of the packets to MAC controller 803.

As described above, device 800 includes a scanning module 806, which is coupled to MAC controller 803 and antenna 810. Scanning module 806 monitors energy received by antenna 810 over channels and time intervals specified by MAC controller 803. This monitoring may involve various energy detection and signal processing techniques. Based on this monitoring, scanning module 806 provides information to MAC controller 803 regarding the existence of transmissions over monitored channels. Based on this information (as well as on packets received from remote devices), MAC controller 803 may generate packets for transmission. Accordingly, device 800 may operate as either a beacon transmitting device, or a scanning device, as described herein.

As shown in FIG. 8, device 800 further includes one or more upper protocol layers 805. These layers may involve, for example, user applications. Accordingly, upper layers 805 may exchange information with remote devices. This involves layer(s) 805 exchanging protocol data units with MAC controller 803. In turn, MAC controller 803 operates with PHY controller 802 and transceiver 804 to transmit and receive corresponding wireless signals.

The devices of FIG. 8 may be implemented in hardware, software, firmware, or any combination thereof. For instance, scanning module 806, upconverter 818, transmit amplifier 820, receive amplifier 824, and downconverter 822 may include electronics, such as amplifiers, mixers, and filters. Moreover, implementations of device 800 may include digital signal processor(s) (DSPs) to implement various modules, such as scanning module 806, IFFT module 814, zero padding module 816, and FFT module 826. Moreover, in embodiments of the present invention, processor(s), such as microprocessors, executing instructions (i.e., software) that are stored in memory (not shown) may be used to control the operation of various components in device 800. For instance, components, such as PHY controller 802 and MAC controller, may be primarily implemented through software operating on one or more processors.

IV. Operation of Beacon-Transmitting Devices

Figure 9:
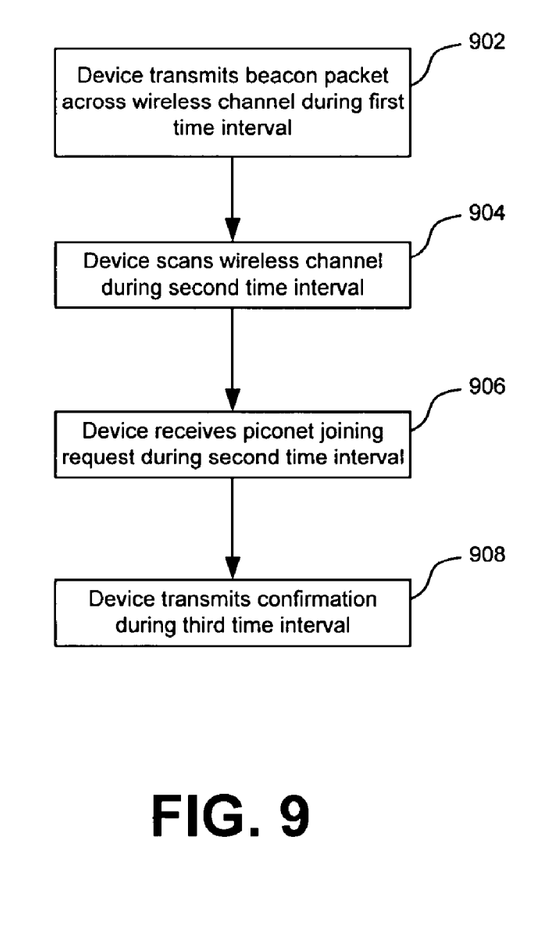
FIGS. 9 and 10 are flowcharts of operations performed by a beacon-transmitting device.
Figure 10:
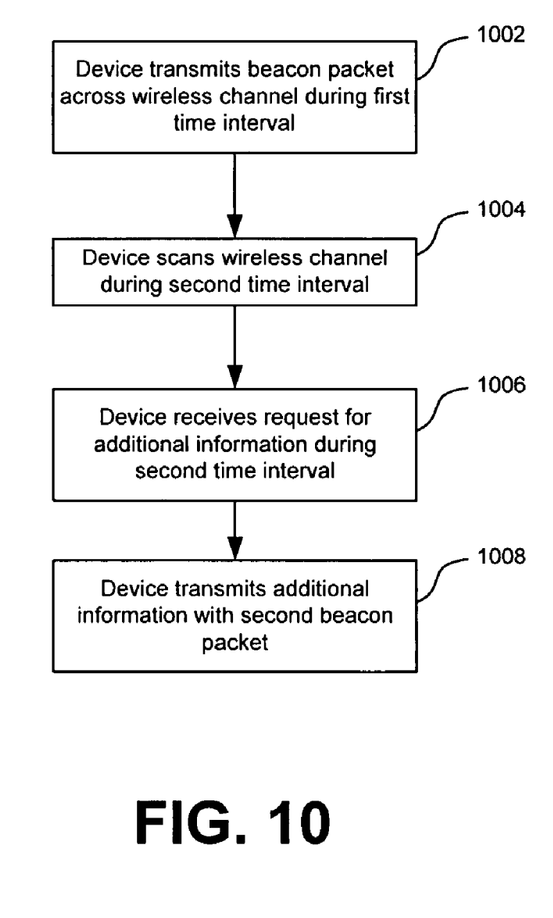

FIGS. 9 and 10 are flowcharts illustrating operations of a device, such as device 800. Examples of these operations are described above with reference to FIGS. 6A, 6B, and 7.

The operation of FIG. 9 includes a step 902 in which the device transmits a beacon packet across a wireless channel during a first predetermined time interval. Next, in a step 904, the device scans the wireless channel for a second predetermined time interval that immediately follows the first predetermined time interval.

In a step 906, the device receives a piconet joining request packet from a remote wireless communications device during the second predetermined time interval. In a step 908, the device transmits a confirmation packet to the remote wireless communications device. This step is performed during a third predetermined time interval that immediately follows the second predetermined time interval.

All processes disclosed herein may be embodied as instructions in a non-transitory computer-readable medium that may be executed by a computing device, processor, or other similar device. In addition, any of the various wireless communication devices or other computing devices disclosed herein may include instructions stored in a non-transitory computer-readable medium that may be executed by a computing device, processor, or other similar device. Those of ordinary skill in the art will appreciate that other instructions and operations necessary to implement the described invention may also be stored on the computer-readable medium.

The operation of FIG. 10 includes a step 1002 in which the device transmits a first beacon packet across a wireless channel during a first predetermined time interval. Next, in a step 1004, the device scans the wireless channel. This is performed during a second predetermined time interval, which immediately follows the first predetermined time interval.

In a step 1006, the device receives a request for additional information from a remote wireless communications device. This occurs during the second predetermined time interval. In response to this request, the device transmits the additional information with a second beacon packet across the wireless channel in a step 1008.

V. Conclusion

While various embodiments of the present invention have been described above, it should be understood that they have been presented by way of example only, and not in limitation. For instance, although examples have been described involving IEEE 802.15.3 and/or IEEE 802.15.3a communications, other short-range and longer-range communications technologies are within the scope of the present invention. Moreover, the techniques of the present invention may be used with signal transmission techniques other than OFDM and TFCs.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of forming a piconet, the method comprising:
    transmitting a beacon packet from a wireless communications device across a wireless channel during a first predetermined time interval;
    scanning the wireless channel from the wireless communications device for a second predetermined time interval, the second predetermined time interval immediately following the first predetermined time interval;
    receiving a piconet joining request packet from a remote wireless communications device during the second predetermined time interval; and
    transmitting a confirmation packet to the remote wireless communications device during a third predetermined time interval, the third predetermined time interval immediately following the second predetermined time interval and before transmitting a second beacon packet;
    wherein the beacon packet, the piconet joining request packet, and the confirmation packet are communicated according to a repeating superframe pattern, and wherein the first, second, and third predetermined time intervals are all included within a single superframe of the repeating superframe pattern.

2. The method of claim 1, wherein the piconet joining request includes a request for a role switch.

3. The method of claim 2, further comprising receiving a beacon packet from the remote wireless communications device.

4. The method of claim 1, wherein the beacon packet, the piconet joining request packet, and the confirmation packet each include one or more OFDM symbols.

5. The method of claim 1, wherein the wireless channel employs a frequency hopping pattern.

6. A method in a wireless communications device, comprising:
    transmitting a first beacon packet from the wireless communications device across a wireless channel during a first predetermined time interval;
    scanning the wireless channel from the wireless communications device for a second predetermined time interval, the second predetermined time interval immediately following the first predetermined time interval;
    receiving a request for additional information from a remote wireless communications device during the second predetermined time interval; and
    transmitting the additional information with a second beacon packet across the wireless channel;
    wherein the first beacon packet, the request for additional information, and the additional information are communicated according to a repeating superframe pattern, and wherein the first and second predetermined time intervals and the transmitting the additional information are all included within a single superframe of the repeating superframe pattern.

7. The method of claim 6, wherein the additional information includes available services from the wireless communications device.

8. The method of claim 6, wherein the additional information includes identifiers of devices that are in a piconet with the wireless communications device.

9. The method of claim 6, wherein the wireless channel employs a frequency hopping pattern.

10. A wireless communications device, comprising:
    means for transmitting a beacon packet across a wireless channel during a first predetermined time interval;
    means for scanning the wireless channel for a second predetermined time interval the second predetermined time interval immediately following the first predetermined time interval;
    means for receiving a piconet joining request packet from a remote wireless communications device during the second predetermined time interval; and
    means for transmitting a confirmation packet to the remote wireless communications device during a third predetermined time interval, the third predetermined time interval immediately following the second predetermined time interval and before transmitting a second beacon packet;
    wherein the beacon packet, the piconet joining request packet, and the confirmation packet are communicated according to a repeating superframe pattern, and wherein the first, second, and third predetermined time intervals are all included within a single suprframe of the repeating superframe pattern.

11. A wireless communications device, comprising:
    means for transmitting a first beacon packet across a wireless channel during a first predetermined time interval;
    means for scanning the wireless channel for a second predetermined time interval, the second predetermined time interval immediately following the first predetermined time interval;
    means for receiving a request for additional information from a remote wireless communications device during the second predetermined time interval; and
    means for transmitting the additional information with a second beacon packet across the wireless channel;
    wherein the first beacon packet, the request for additional information, and the additional information are communicated according to a repeating superframe pattern, and wherein the first and second predetermined time intervals and the transmitting the additional information are all included within a single superframe of the repeating superframe pattern.

12. A system for forming a piconet of a plurality of wireless communications devices, the system comprising:
    a beacon-transmitting device that transmits a beacon packet across a wireless channel during a first predetermined time interval; and a remote wireless communication device that receives the beacon packet and transmits a piconet joining request during a second predetermined time interval, the second predetermined time interval immediately following the first predetermined time interval and, wherein the beacon-transmitting device receives the piconet joining request packet during the second predetermined time interval and transmits a confirmation packet to the remote wireless communications device during a third predetermined time interval, the third predetermined time interval immediately following the second predetermined time interval and before transmitting a second beacon packet;

wherein the beacon packet, the piconet joining request packet, and the confirmation packet are communicated according to a repeating superframe pattern, and wherein the first, second, and third predetermined time intervals are all included within a single superframe of the repeating superframe pattern.

13. The system of claim 12, wherein the piconet joining request includes a request for a role switch.

14. The system of claim 13, wherein the remote wireless communications device transmits the beacon packet and the beacon-transmitting device receives the beacon packet.

15. The system of claim 12, wherein the beacon packet, the piconet joining request packet, and the confirmation packet each include one or more OFDM symbols.

16. The system of claim 12, wherein the wireless channel employs a frequency hopping pattern.

17. The device of claim 10, wherein the piconet joining request includes a request for a role switch.

18. The method of claim 6, wherein the second beacon packet comprises a beacon extension.

19. A non-transitory computer-readable medium having instructions stored thereon, the instructions comprising:
   instructions to transmit a beacon packet across a wireless channel during a first predetermined time interval;
   instructions to scan the wireless channel for a second predetermined time interval, the second predetermined time interval immediately following the first predetermined time interval;
   instructions to receive a piconet joining request packet from a remote wireless communications device during the second predetermined time interval; and
   instructions to transmit a confirmation packet to the remote wireless communications device during a third predetermined time interval, the third predetermined time interval immediately following the second predetermined time interval and before transmitting a second beacon packet;
   wherein the beacon packet, the piconet joining request packet, and the confirmation packet are communicated according to a repeating superframe, pattern, and wherein the first second, and third predetermined time intervals are all included within a single superframe of the repeating superframe pattern.

20. A non-transitory computer-readable medium having instructions stored thereon, the instructions comprising:
   instructions to transmit a first beacon packet from the wireless communications device across a wireless channel during a first predetermined time interval;
   instructions to scan the wireless channel from the wireless communications device for a second predetermined time interval, the second predetermined time interval immediately following the first predetermined time interval;
   instructions to receive a request for additional information from a remote wireless communications device during the second predetermined time interval; and
   instructions to transmit the additional information with a second beacon packet across the wireless channel;
   wherein the first beacon packet, the request for additional information, and the additional information are communicated according to a repeating superframe pattern, and wherein the first and second predetermined time intervals and the transmitting the additional information are all included within a single superframe of the repeating superframe pattern.

* * * * *

UNITED STATES PATENT AND TRADEMARK OFFICE
CERTIFICATE OF CORRECTION

PATENT NO. : 8,156,229 B2
APPLICATION NO. : 12/836817
DATED : April 10, 2012
INVENTOR(S) : Reunamäki et al.

It is certified that error appears in the above-identified patent and that said Letters Patent is hereby corrected as shown below:

In Column 8, Line 12, delete "when BeaconStarts)" and insert -- whenBeaconStarts) --, therefor.

In Column 12, Line 42, in Claim 10, delete "suprframe" and insert -- superframe --, therefor.

Signed and Sealed this
Fourth Day of September, 2012

David J. Kappos
*Director of the United States Patent and Trademark Office*